Sept. 1, 1953 J. N. HOFFMAN 2,650,689

CARRIAGE TABULATING MECHANISM

Filed Dec. 26, 1950 8 Sheets-Sheet 1

INVENTOR
JACOB N. HOFFMAN
BY Jesse A. Holton
ATTORNEY

INVENTOR.
JACOB N. HOFFMAN
BY Jesse A. Holton
ATTORNEY

Sept. 1, 1953

J. N. HOFFMAN 2,650,689

CARRIAGE TABULATING MECHANISM

Filed Dec. 26, 1950

8 Sheets-Sheet 3

INVENTOR
JACOB N. HOFFMAN
BY Jesse A. Holton
ATTORNEY

CARRIAGE TABULATING MECHANISM

Filed Dec. 26, 1950 8 Sheets-Sheet 4

INVENTOR
JACOB N. HOFFMAN
BY Jesse A. Holton
ATTORNEY

INVENTOR.
JACOB N. HOFFMAN
BY Jesse A. Holton
ATTORNEY

INVENTOR
JACOB N. HOFFMAN
BY
Jesse A. Holton
ATTORNEY

Sept. 1, 1953 J. N. HOFFMAN 2,650,689

CARRIAGE TABULATING MECHANISM

Filed Dec. 26, 1950 8 Sheets-Sheet 7

INVENTOR.
JACOB N. HOFFMAN
BY Jesse A. Holton
ATTORNEY

INVENTOR.
JACOB N. HOFFMAN

BY Jesse A. Holton

ATTORNEY

Patented Sept. 1, 1953

2,650,689

UNITED STATES PATENT OFFICE 2,650,689

CARRIAGE TABULATING MECHANISM

Jacob N. Hoffman, Harrisburg, Pa., assignor to Underwood Corporation, New York, N. Y., a corporation of Delaware Application December 26, 1950, Serial No. 202,768

11 Claims. (Cl. 197—178)

Figure 1:
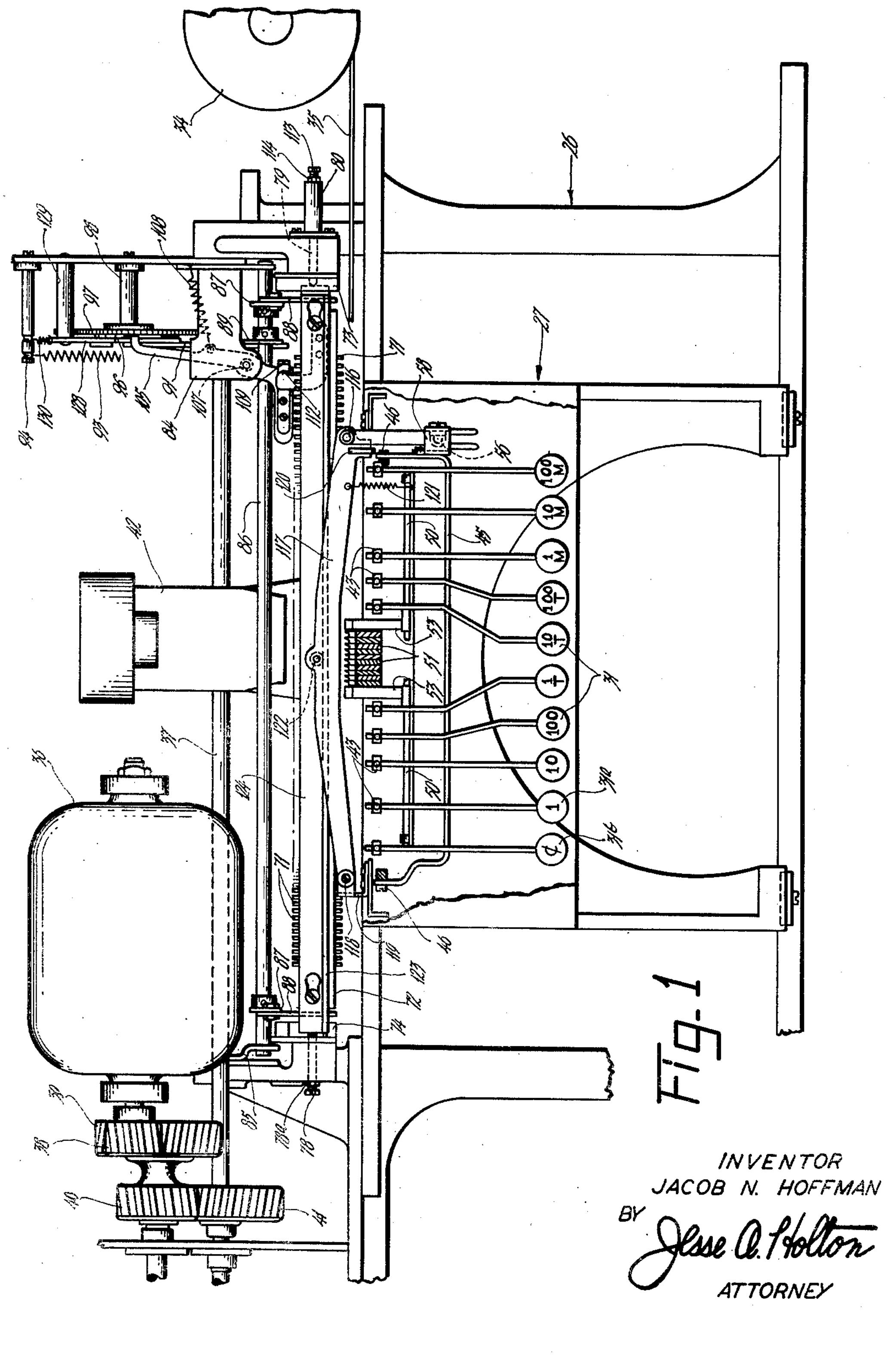

This invention relates to typewriting machines, and more particularly to carriage tabulating means therefor.

Flat platen typewriting machines such as described herein comprise, in part, a type head, hereinafter referred to as the carriage, including alphabet and numeral keys and associated printing elements, which carriage is mounted on a frame for movement, letter space by letter space, under the control of an escapement mechanism, by power of a strong coiled band spring. The carriage also includes a group of tabulator keys which, when individually depressed and so long as one is held depressed, simultaneously releases the carriage from the control of the escapement mechanism for tabulation by the power exerted by the band spring, and conditions a stop associated therewith for engagement with one of a plurality of cooperating stops rigid in the carriage supporting frame and arranged to arrest the carriage in various columnar positions. The stops rigid in the frame are arranged to arrest the carriage slightly less than one letter space in advance of the desired columnar position. In prior machines of this type, the stops acted upon by the tabulator keys have been removed from engagement with the rigid stops by springs when the tabulator key is released to enable the carriage to complete its tabulatory movement under control of the aforementioned escapement mechanism. Such construction leaves the machine in a condition which enables depression of the same tabulator key for a plurality of successive tabulations of the carriage without interference between the movable and rigid stop members.

The carriage is, generally, of considerable weight. The band spring to move the carriage must contain sufficient reserve power to initiate substantially instantaneous movement of the carriage from any of its positions on its supporting frame; and because of this, the pressure applied to the movable stop member necessitates the employment of strong key restoring springs to effect their disengagement from the rigid stop member upon the release of a tabulator key. These key restoring springs must be tensioned by depression of the tabulator key and consequently the pressure required to operate a tabulator key is considerably greater than that required to depress an alphabet or numeral key to effect action of the associated power operated printing element.

The difference in pressure required to operate the different sets of keys is undesirable, as it provides an unbalanced keyboard which affects the "touch" of a machine operator and retards speeu of machine operation.

Another difficulty with such prior machines is due to the weight of the carriage and the strong band spring required to move it for tabulation and letter space movements. During tabulating movements of about two or more inches, the momentum of the carriage is such as to impose a severe strain on the rigid stops resulting in frequent breaking of the stops since they must be made of very hard and consequently brittle steel.

Also the rigid stops must be about five letter spaces in thickness at their base if they are to give satisfactory service and this thickness prevents use of closely adjacent columnar positions for tabulation.

One object of the present invention is to provide a tabulating mechanism for a flat platen typewriting machine wherein the pressure required to operate the tabulator key is substantially the same as the pressure required to operate the alphabet and numeral keys.

Another object is the provision of a tabulating mechanism which will permit the use of an easily operated key mechanism to control tabulating movements of a heavy typing carriage.

A further object of the invention is the provision of a tabulating mechanism which will not put any appreciable strain on the carriage arresting columnar stops, thus enabling light stop members to be used.

Still another object is the provision of a tabulating mechanism suitable for heavy typing carriages which tabulating mechanism uses thin columnar position members which may be spaced at letter space intervals to control the arresting of the carriage.

It is also an object of this invention to provide a flat platen typewriting machine having a heavy typing carriage with a tabulating mechanism having advantages similar to the tabulating mechanism for standard typewriters, that is key settable tabulator stop members arranged at single letter space intervals.

With these and other incidental objects in view, the invention consists in certain novel features of construction and combination of parts, the important elements of which are included in the showing of a preferred embodiment of the invention hereinafter described with reference to the accompanying drawings forming part of this description.

Figures 2, 18:
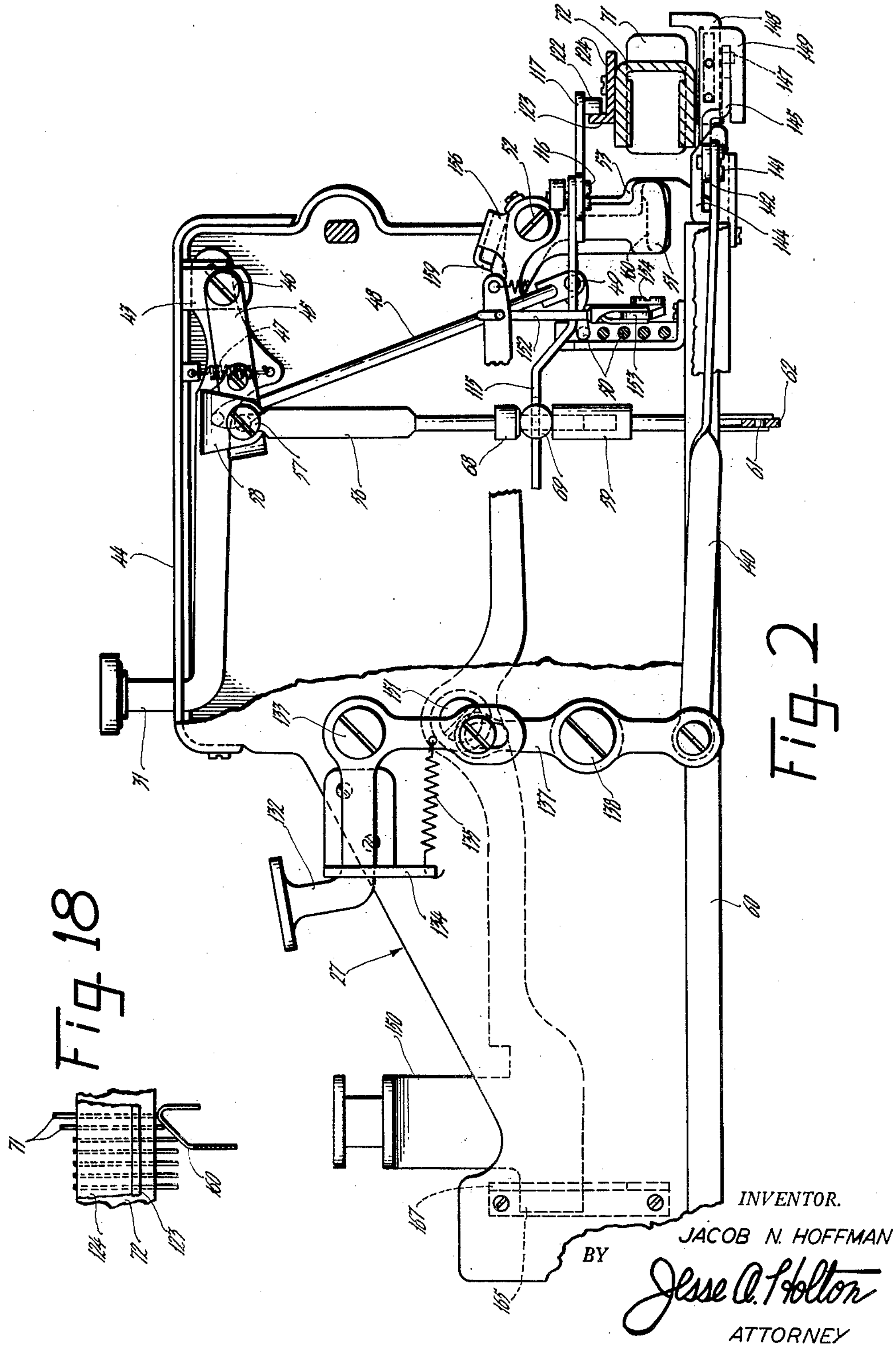
Figures 3, 12:
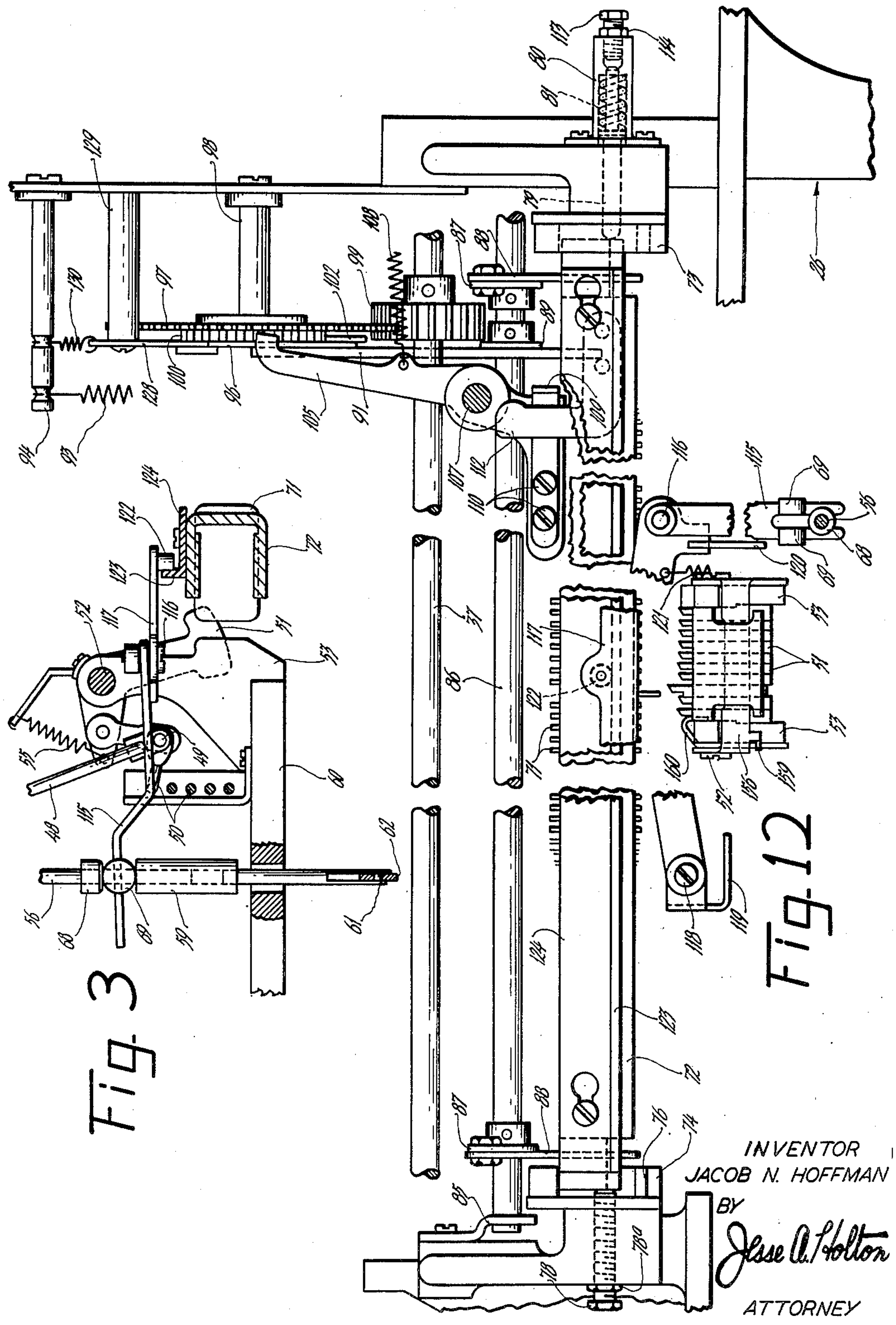
Figure 4:
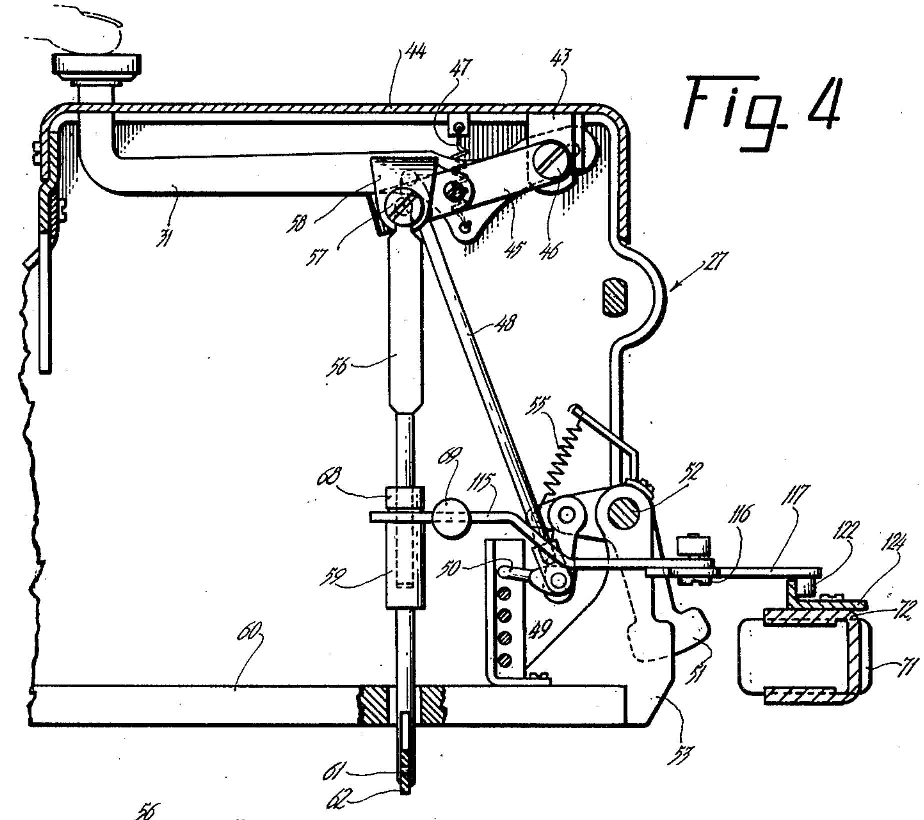
Figure 5:
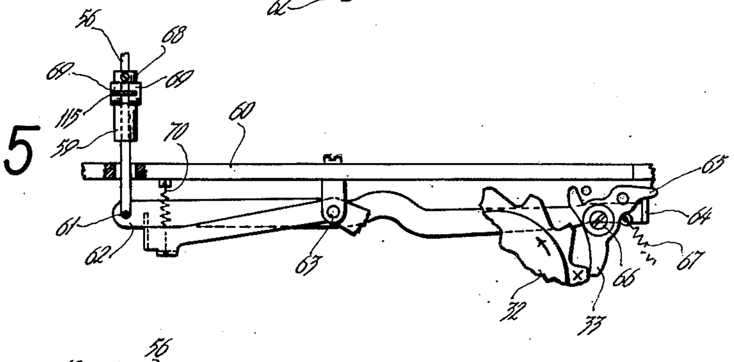
Figure 6:
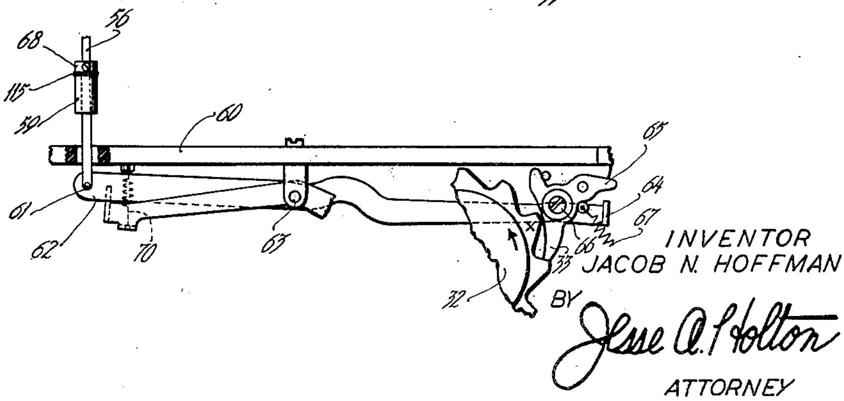
Figures 7, 9:
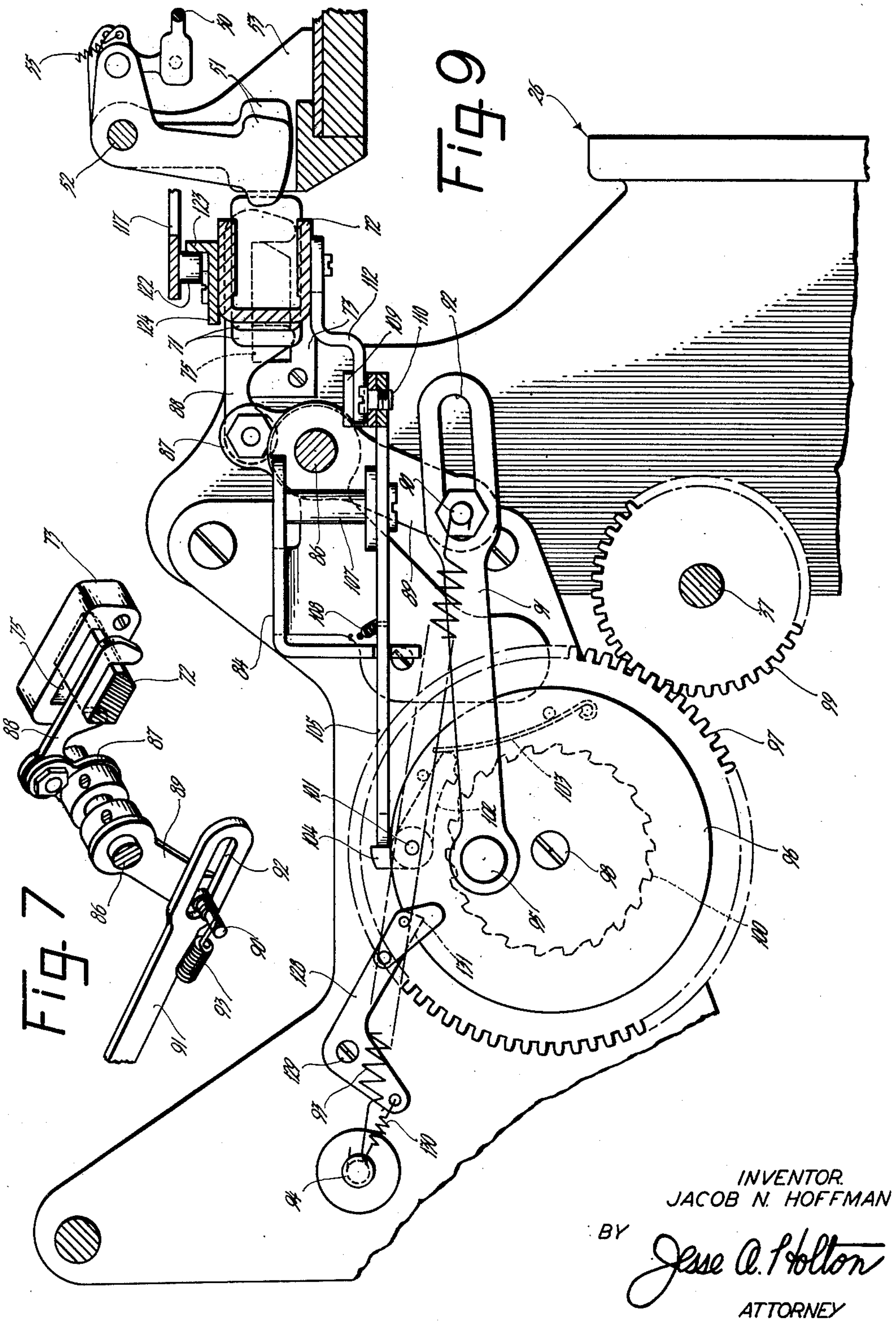
Figures 8, 13:
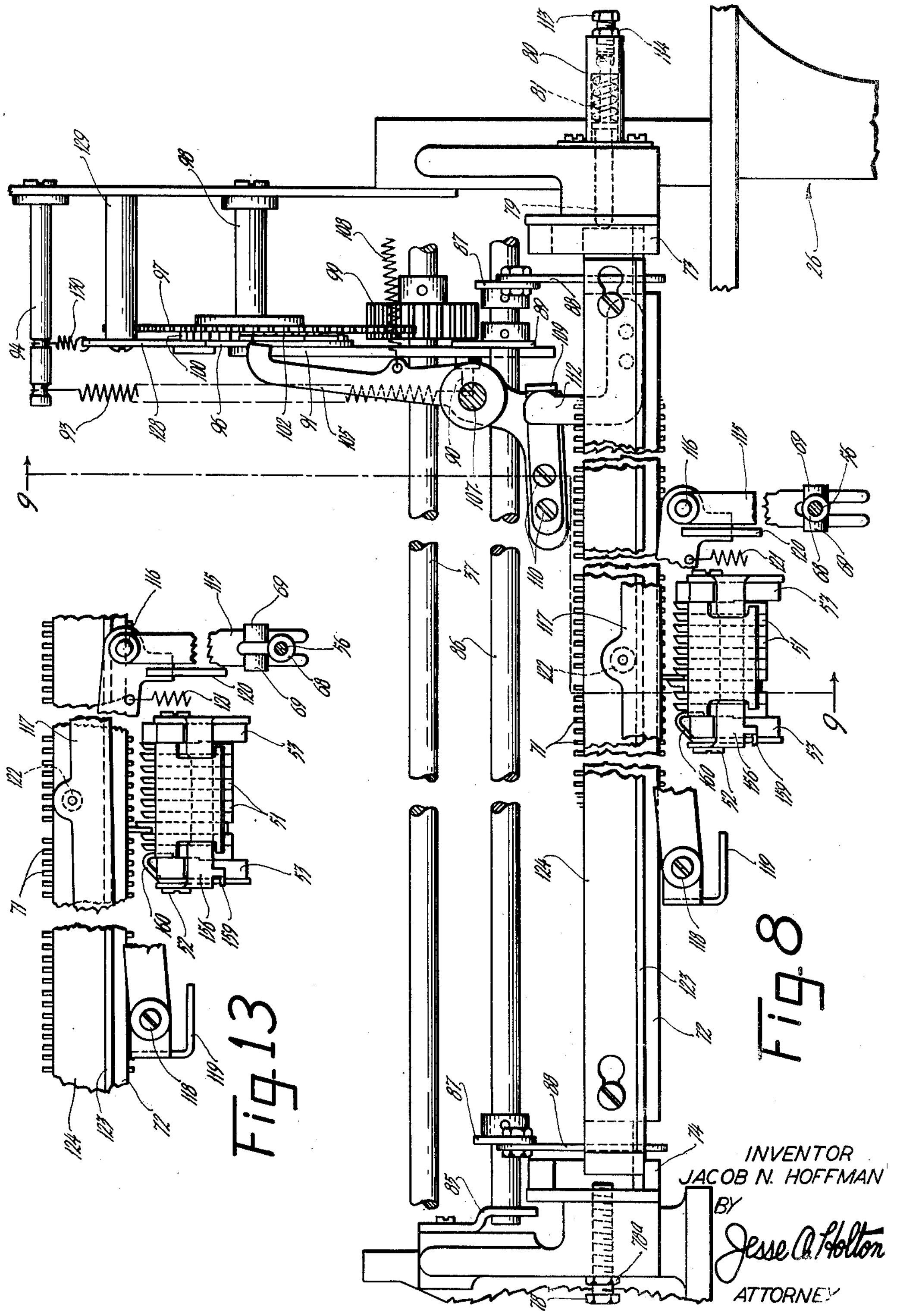
Figure 10:
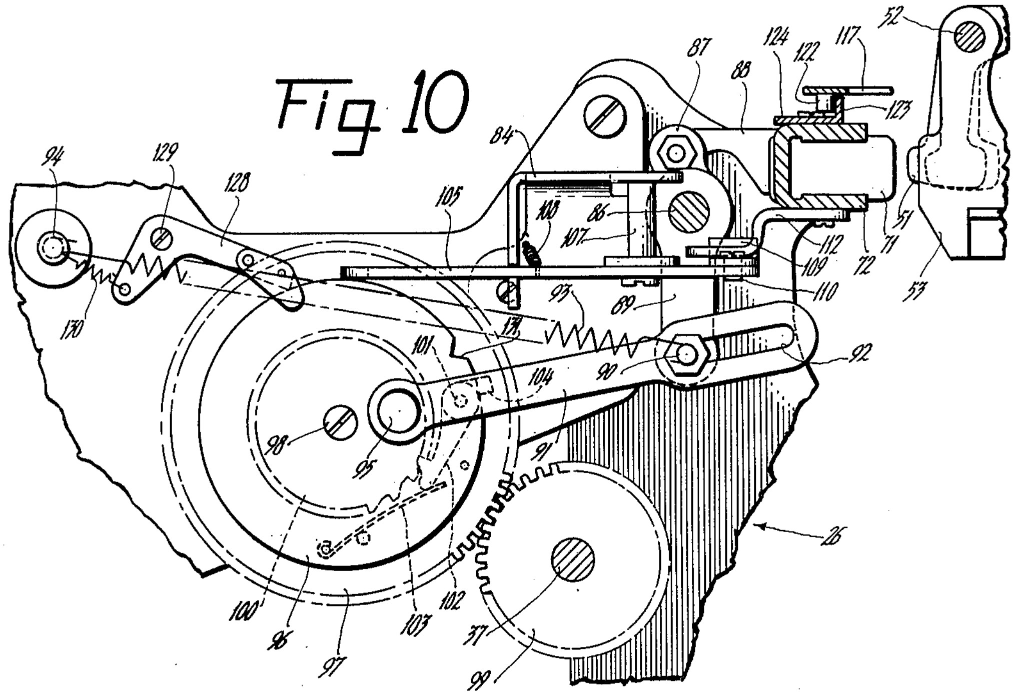
Figure 11:
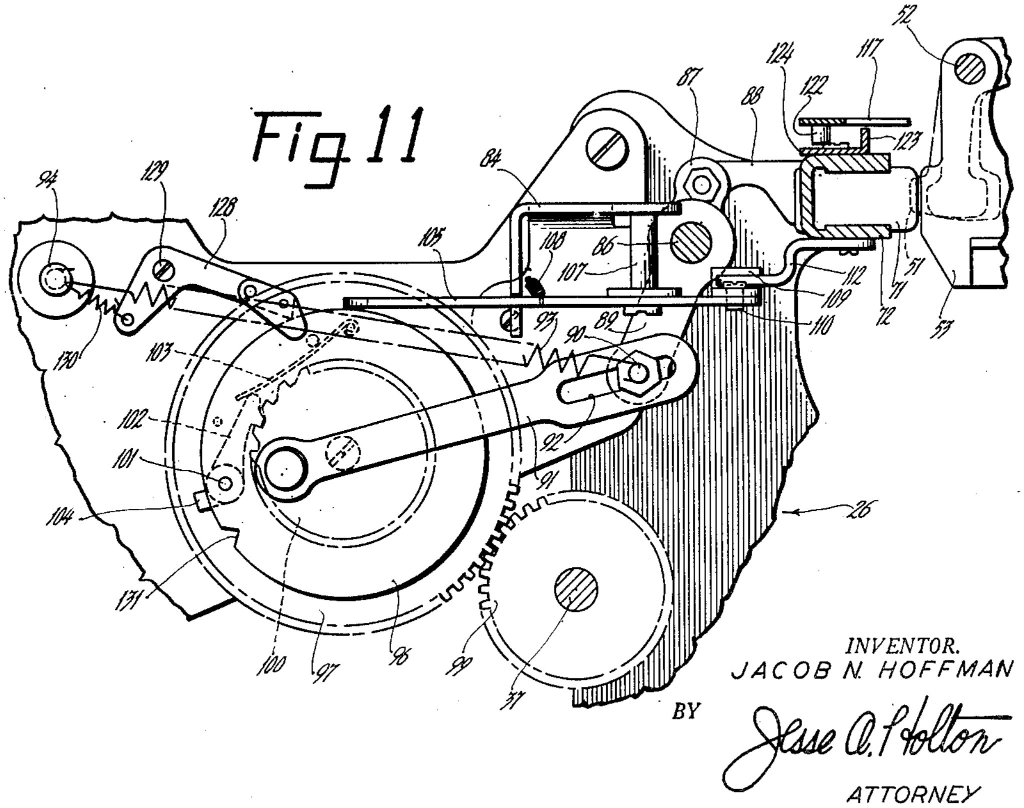
Figures 14, 15, 16, 17:
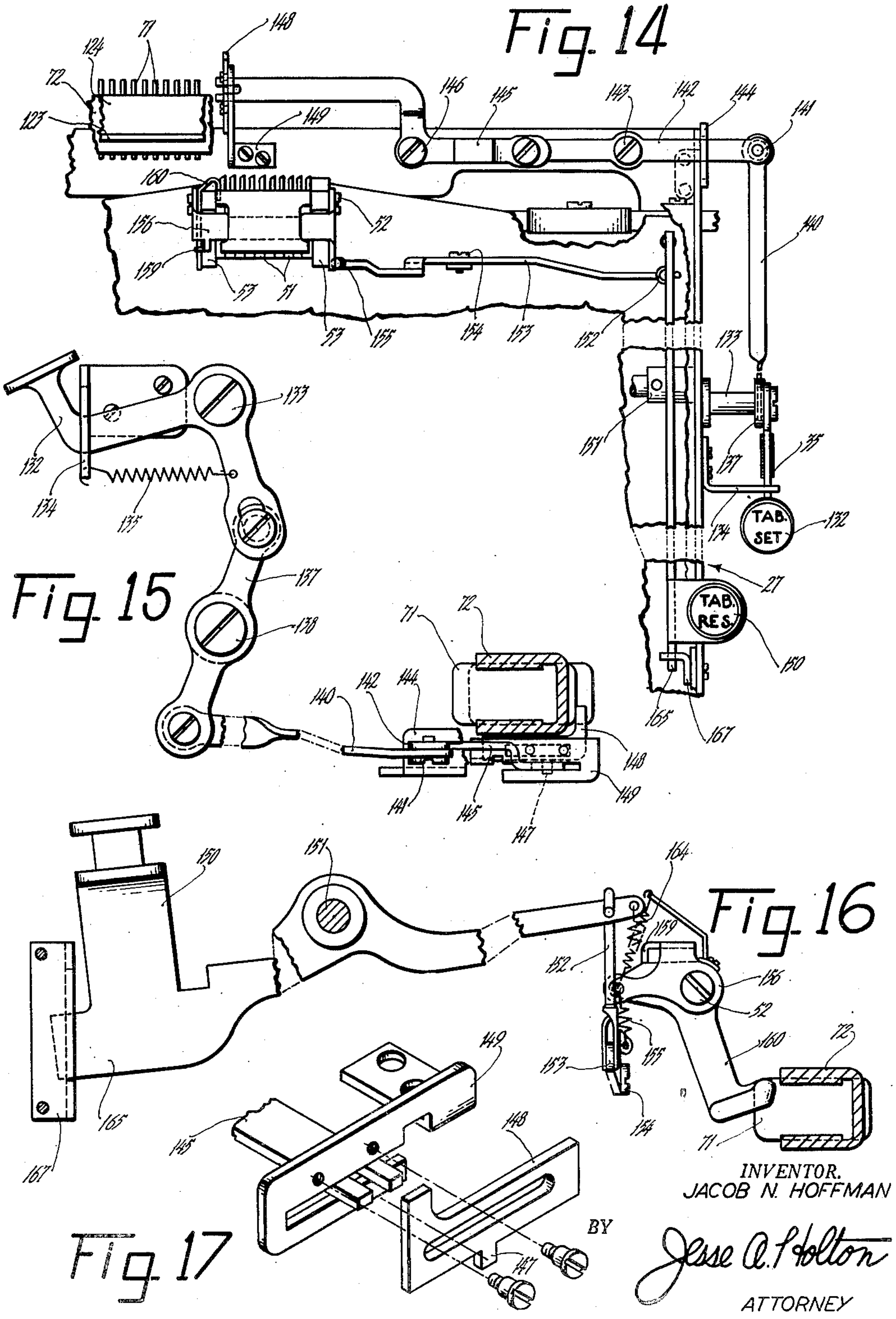

In the drawings:

Figure 1 is a top plan view showing the parts in their normal or inoperative position, Figure 2 is a right side view, partly in section, showing the tabulator mechanism, the tabulator stop setting and the tabulator stop restoring mechanism in normal position, Figure 3 is a view similar to a part of Figure 2 showing a tabulator key depressed and the carriage midway between columnar positions, Figure 4 is a view similar to a portion of Figure 2 showing the tabulator key depressed and the tabulator stops disengaged, Figure 5 is a detail view showing the carriage escapement mechanism disengaged when the mechanism is in the condition illustrated in Figure 3, Figure 6 is a view similar to Figure 5 but showing the escapement mechanism reengaged when the tabulating mechanism is in the condition shown in Figure 4, Figure 7 is a perspective view showing the mounting mechanism for the tabulator stop rack, Figure 8 is a top plan view showing the parts in the position of engagement of the carriage and frame tabulator stops just prior to the instant of arrest of the carriage from the tabulation movement and while the tabulator key is held depressed, Figure 9 is a view in vertical section taken on the line 9, Figure 8, showing the parts during the initial portion of a tabulating movement of the carriage, Figure 10 is a view similar to Figure 9 showing the parts in the positions they occupy during the arresting of tabulation of the carriage, Figure 11 is a view similar to Figures 9 and 10 showing the parts in the positions they assume during the completion of the movement of the single revolution clutch, after carriage tabulation has been completed, Figure 12 is a top plan view showing the carriage tabulated to a columnar position with the tabulator key held depressed, and the tabulator bar in its rearward position, Figure 13 is a view similar to a part of Figure 12 showing all mechanisms in their restored positions except the tabulator key which is held depressed, Figure 14 is a top plan view showing the normal arrangement of the tabulator stop setting and resetting mechanism, Figure 15 is a detail view showing the tabulator stop set key depressed, Figure 16 is a detail view showing the tabulator stop reset key depressed, Figure 17 is a perspective view showing a part of the tabulator stop setting mechanism, and Figure 18 is a fragmentary detail view showing the resetting of the tabulator stops during a return movement of the carriage toward its first letter writing position.

The present invention is illustrated and described herein as embodied in the well-known Elliott Fisher Flat Platen Typewriting and Accounting Machine, one type of this machine being disclosed in Patent No. 2,370,505, issued to Oscar J. Sundstrand on February 27, 1945, to which reference may be had for details of construction not fully described or illustrated herein.

Referring to Figure 1 of the drawings, the machine includes a line space frame 26 which is mounted for forward and rearward movement, on a main frame, not shown herein. Mounted for tabulating and return movements on the frame 26 is a typing carriage 27. Included in the carriage are the usual alphabet printing keys, numeral printing keys, space key and the tabulator keys 31.

The carriage 27 is arranged to travel to the right, Figure 1, letter space by letter space upon the depression of any of the alphabet and numeral keys and the space key under the control of an escapement wheel 32, Figures 5 and 6. The mechanism provided for initiating letter space movement by these means is not described herein since it is shown in the above Sundstrand Patent No. 2,370,505 and with the exception of the escapement wheel 32 and certain of its associated parts, it does not concern the present invention. In general, upon the depression of one of the above keys, an escapement dog 33, Figures 5 and 6, is rocked from its normal engagement with the escapement wheel 32, as shown in Figure 6, to a position comparable with that shown in Figure 5, to allow the carriage to letter space under power provided by a coiled hand spring 34, Figure 1, connected with the carriage 27 by means of a band 35.

The carriage 27 is returned to the left from a tabulated position by power derived from an electric motor 36 driving a shaft 37 through a train of gears 38, 39, 40 and 41, Figure 1. The shaft 37, driving a ratchet operated brake mechanism designated generally at 42, controls the speed of tabulation and returns the carriage 27 in the usual manner.

The machine is arranged for either columnar or decimal tabulation of the carriage 27 by the depression of keys 31. Keys 31 are pivotally supported by hangers 43 depending from the carriage cover 44, Figures 2 and 4, and overlie a common bail 45, pivotally supported at 46 in the carriage frame and urged upwardly by springs 47. Secured to each of the keys 31 is a push rod 48, Figures 2, 3 and 4, connected at 49 to shafts 50, and by means of the shafts 50 to stop members 51 pivotally supported on a shaft 52 in a frame 53 in the manner disclosed in the Patent 2,370,505 previously referred to, and in Patent No. 1,280,697, issued October 8, 1918, to H. A. Foothorap. The stop members 51 are arranged in spaced relation in the frame 53 conforming with the letter space arrangement provided in the machine and are normally retained in an inoperative position as shown in Figure 2 by the urge of contractile springs 55, see Figure 3.

Each of the keys 31 is arranged to release the carriage 27 for tabulation upon being depressed. For such release, a push rod 56 is pivotally supported at 57 on a bracket 58 rigid on the common bail 45. Co-extensive but not rigid with the push rod 56 is a member 59 extending downwardly through the deck 60 of the carriage 27 and connected at 61 to a lever 62, Figures 5 and 6. The lever 62 is pivotally supported at 63 on the carriage frame and is formed with an ear 64 underlying an extending tail 65 of the escapement dog 33 which is pivotally supported at 66 in a frame (not shown) and tensioned into engagement with the teeth of the escapement wheel 32 by means of a spring 67. Interposed between a collar 68 affixed to the push rod 56 and the member 59 are filler pieces 69, the purpose of which will be later described. Upon the rocking of bail 45 by the depression of any one of the keys 31, the push rod 56, acting upon the filler pieces 69, forces the member 59 downwardly to rock the lever 62 about its pivot 63 against the urge of a spring 70, and, by means of the ear 64, rocks the escapement dog 33 from engagement with the teeth of the escapement wheel 32 as illustrated in Figure 5, thereby releasing the carriage for tabulation.

Simultaneously with the releasing of the carriage 27 for tabulation as described above, upon the depression of a key 31, the push rod 48 connected therewith, rocks its associated shaft 50, and consequently the stop member 51 connected thereto is moved rearwardly against the urge of the springs 55 into position for engagement with frame mounted stops 71 during the tabulation of the carriage.

The stops 71 are supported for movement on the line space frame 26 forwardly to operative and rearwardly to inoperative positions in a U-shaped tabulator bar 72, in the same manner as the stops illustrated and fully described in Patent No. 2,278,010, issued to W. F. Helmond on March 31, 1942. The stops 71 are arranged in the tabulator bar 72 at letter space distances. By the use of the different tabulator keys 31 the carriage 27 may be tabulated directly to a desired decimal position in a column of the work sheet. On the other hand, certain types of work produced in machines of the character described herein require the combining of columnar and decimal tabulation. In the prior machines, a separate key is provided for initiating columnar tabulation. In the present machine, the dollar tabulator key 31*a*, Figure 1, may be employed for this purpose as well as for decimal tabulation. Such an arrangement provides for either columnar or decimal tabulation from a single set of keys.

Conditioning of the machine to arrest the carriage 27 in any columnar or decimal position is obtained by setting selected stops 71 forwardly in the tabulator bar in a manner to be later described to define columnar positions. During tabulation of the carriage 27 under control of a depressed tabulator key 31, the stop member 51 extended by the depression of the key 31 abuts the next adjacent extended stop 71 to the right and thereby effects release of the escapement dog 33 from control by push rod 56. Escapement dog 33 is then returned by the spring 67 to position for engagement with the next tooth of the escapement wheel 32.

The present invention provides means to disengage the stops 51 and 71 and release escapement dog 33 by power. Springs 55 are required only to retain the unoperated tabulator keys 31 in their normal position and each tabulator key 31 is opposed only by the resistance offered by the light springs 47 and 55, the combined resistance of said springs being substantially equal to that offered by the alphabet and numeral keys and the space bar keys. For this purpose, the tabulator bar 72 is supported for forward, rearward and transverse movements in a pair of blocks 73 and 74 affixed in the frame 26. One end of the tabulator bar 72 is slidably retained in a semi-rectangular seat 75, Figures 6 and 7, provided in the block 73, while the other end of the bar 72 is slidably supported in an upwardly opening seat 76, in the block 74, Figure 12, where it is held against upward movement by means of a catch, not shown, in the same manner as is disclosed in Foothorap Patent No. 1,280 697, above. Normally, the tabulator bar 72 is tensioned leftwardly to bear against an adjusting screw 78 in the frame 26 by a plunger 79, slidably supported in a member 80 affixed to the machine frame 26, and acted upon by a compression spring 81, Figures 8 and 12. The adjusting screw 78 is normally set to position the tabulator bar 72 so that each of the stops 71 therein can be aligned with the spaces between the blades 51 and screw 78 is locked in that position by means of a lock nut 78*a*.

Pivotally supported in brackets 84 and 85 affixed to the right and left sides respectively of the frame 26 is a shaft 86. Rigid on the shaft 86 are two levers 87 and pivotally supported on each lever 87 is a hook 88 which hooks over the tabulator bar 72 at its ends, as shown in detail in Figure 7. Also, rigid on the shaft 86 is a depending arm 89, slidably supporting thereon by means of a stud 90, Figures 7 and 9 to 11, a link 91 provided with a slot 92, in which stud 90 is engaged. A spring 93, stretched between the stud 90 and a stud 94 affixed in the frame 26, normally urges the shaft 86 to rock clockwise, Figures 7 and 9 to 11, and by means of the hooks 88 holds the tabulator bar 72 in its forward position. The link 91 is pivotally secured at 95, Figures 9, 10 and 11, to a disc 96, forming part of a single revolution clutch which is substantially of the same construction as the clutch described and illustrated in Patent No. 2,362,222, issued to O. J. Sundstrand on November 7, 1944. The clutch includes, generally, a gear 97 rotatably supported on a stud 98 rigid in the machine frame 26, and driven by a gear 99 rigid on the constantly revolving shaft 37. Affixed on the gear 97 is a ratchet wheel 100 and mounted for free rotation on the stud 98 is the before mentioned disc 96. Pivoted at 101, Figures 9 to 11, on the disc 96 is a pawl 102, normally tensioned toward engagement with the teeth of the ratchet wheel 100 by means of a leaf spring 103, and having an upstanding lug 104. A lever 105 pivotally mounted on a stud 107 depending from the bracket 84, extending rearwardly, rests in front of the upstanding lug 104 of the pawl 102, under the urge of a spring 108, and holds the pawl 102 normally out of engagement with the teeth in the ratchet wheel 100, as shown in Figure 9. Extending forwardly from its pivot on stud 107, the lever 105 is provided with an upstanding member 109, mounted thereon by means of screws 110. Firmly secured to the tabulator bar 72 is an actuating member 112 extending rearwardly into lateral alignment with the member 109.

During tabulating movement of the carriage 27, a projected stop member 51 will abut a projected one of the frame stops 71 as shown in Figure 8, and shift the entire tabulator bar 72 rightwardly, against the resistance offered by the plunger 79 and spring 81 until bar 72 is arrested by the abutment of the plunger 79 and a stop 113 threaded in the member 80 and locked in its adjusted position by means of a lock nut 114, this arresting position being slightly less than one letter space to the left of the final desired position of the carriage. During the rightward movement of the tabulator bar 72 and just before abutment of the plunger 79 with stop 113, the member 112 on bar 72 strikes the upstanding member 109 on lever 105 and pivots the lever 105 sufficiently to remove its rearwardly extending portion from abutment with the upwardly extending lug 104 of the pawl 102. Pawl 102 thereupon engages in the teeth of the constantly rotating ratchet wheel 100, under the urge of the spring 103, with a consequent clockwise rotation, Figure 9, of the disc 96. During the rotation of disc 96, the link 91, bearing against the stud 90 in the arm 89, rocks the shaft 86 counterclockwise against the pull of spring 93 and, by means of the hooks 88 on levers 87, draws the tabulator bar 72 rearwardly to disengage the abutting stop members 51 and 71 as shown in Figures 10 and 12.

Since, as before mentioned, the stop members 71 arrest the carriage 27 approximately one letter space to the left of its final destination and are immediately withdrawn from engagement, escapement dog 33 must be released at this time to engage the next succeeding tooth of the escapement wheel 32 and arrest the carriage 27 in its final position. To accomplish this release of escapement dog 33, the filler pieces 69, Figures 2, 3 and 4, are affixed to a slide 115 bifurcated to span the push rod 56 and pivotally secured at 116 to a lever 117. The lever 117 is pivotally supported at 118 on a bracket 119 affixed to the typing carriage 27 and is slidably supported at its right end in a bracket 120, Figures 1, 8, 12 and 13, affixed to the carriage 27. Lever 117 is tensioned clockwise about its pivot 118 to the position shown in Figure 8 by a spring 121 to normally retain the filler pieces 69 in position between the member 59 and collar 68, as shown in Figure 2. Rigid in the lever 117 is a depending stud 122 which is positioned behind an upstanding leg 123 of an angle plate 124, screwed to the top of the tabulator bar 72 and extending transversely on the tabulator bar 72 to overlie the hooks 88 and prevent their lifting during movement of the tabulator bar. As the tabulator bar 72 is moved rearwardly upon the rocking of the shaft 86, as described above, the upstanding leg 123 strikes the stud 122 and pivots the lever 117 counterclockwise, Figure 12, to draw the filler pieces 69 from their position between the members 59 and 68, see also Figure 4. This withdrawal of fillers 69 enables the spring 70, Figures 5 and 6, to return the lever 62 to its normal position and the spring 67 to tension the escapement dog 33 into engagement with a tooth in the escapement wheel 32, as shown in Figure 5, before full disengagement of the stop members 51 and 71 occurs, and while the tabulator key 31 is held depressed as shown in Figures 4, 12 and 13. Immediately upon the disengagement of the stops 51 and 71, the carriage 27 tabulates to its final destination as controlled by the escapement dog 33 entering fully into the adjacent notch of escapement wheel 32 as shown in Figure 6. Simultaneously, the plunger 79, acted upon by the spring 81, returns the tabulator rack 72 to its leftward position abutting the stop 78, placing the active stop 71 to the left of the projected stop 51 just before the tabulator rack 72 has reached its rearmost position, as shown in Figure 12. Also, as the tabulator bar 72 moves leftwardly, the member 112 moves away from member 109, enabling spring 108 to return lever 105 to its position in front of the upstanding lug 104 of the pawl 102.

When the tabulator bar 72 reaches its rearmost position and the stud 95 in the clutch disc 96 passes over center as in Figure 10, the spring 93, opposing such movement of the tabulator bar, snaps the bar 72 forwardly and drives pawl 102 clockwise ahead of the movement of the ratchet wheel 100, bar 72 stopping against the forward ends of its seat in the blocks 73 and 74. During the remainder of the movement of the disc 96 and gear 97, the stud 90 rides idly in the slot 92 in the link 91 as is illustrated in Figure 11. At the end of the revolution of disc 96, upstanding lug 104 of the pawl 102 strikes the end of the lever 105 which has been restored as above described, rocking the pawl 102 about its pivot 101 to disengage it from the teeth of the ratchet wheel 100 against the urge of the leaf spring 103, and thereby limits the movement of the disc 96 to one revolution. A second pawl 128, pivoted on a stud 129 in the frame 26 and tensioned by a spring 130, engages a notch 131, Figures 9 to 11, in the disc 96, to hold the disc 96 against retrograde movement by spring 103.

When tabulator bar 72 is returned to its forward position by springs 93, the stop member 71 which has just stopped tabulation of carriage 27 is positioned to the left of the extended stop 51, as shown in Figure 13, but filler pieces 69 are prevented from entering between collar 68 and member 59 so long as a tabulator key 31 is held depressed. Upon release of key 31 pieces 69 are restored between collar 68 and member 59 by spring 121, and keys 31 may be again operated for further tabulations of carriage 27.

The present invention provides means whereby the stop members 71 may be projected into operable position from the keyboard. A stop setting key 132, Figures 2, 14, 15 and 17, is pivotally mounted on a stud 133 on the carriage 27 and is supported in a guide 134, also secured to the carriage 27, and is tensioned to its raised position by means of a spring 135. Key 132 is connected to a lever 137 pivoted on a stud 138 on the carriage frame, and connected to lever 137 is a link 140. The link 140 is connected at 141 with a lever 142 pivoted at 143 and supported in a guide bracket 144 secured to the carriage frame. A lever 145, pivotally supported on the carriage frame at 146, engages a depending lug 147 of a member 148, supported for forward and rearward movement on a bracket 149 rigid on the bottom plate 60 of the carriage 27, see also Figure 17. The member 148 is directly behind the stop members 71 and is in alignment with the space between the blades 51 associated with the tabulator keys 31*a* and 31*b*. Upon the depression of the key 132 and the actuation thereby of the members 137, 140, 142 and 145, the member 148 is moved forwardly, pushing the stop 71 forwardly into operating position, as shown in Figure 15. Upon the release of the key 132, the chain of members is returned to normal position by spring 135.

The present invention also provides means whereby the stops 71 which have been set in operating position by the depression of the key 132 may be reset or returned to their inoperative position from the keyboard. To this end, a key 150, Figures 2, 14, and 16, is pivotally supported on a stud 151 fixed to the right side of carriage 27. The rear end of this key 150 is connected by means of a link 152 to a lever 153 which lever 153 is pivoted on a stud 154 in the carriage and connected by means of a spring 155 to a cradle 156. The cradle 156 is pivotally supported on the tabulator frame 53 and is provided with a lug 159 which overlies a member 160 pivoted on shaft 52 outside of the left side of frame 53. The member 160 is provided with a depending leg, the lower end of which is bent into a U shape which fits over the left side part of frame 53 and provides a substantially rigid cam, see also Figure 18, said cam being normally tensioned against the frame 53 by means of a spring 164, Figure 16, similar to the springs 55 for the tabulator blades 51. Upon the depression of key 150, the cradle 156 is rocked counterclockwise by the lever 153 from the Figure 2 position to the position shown in Figure 16. The lug 159 on the cradle 156, bearing on the member 160, rocks that member to place the lower U-shaped arm adjacent the tabulator bar 72 and in wiping relation with the stops 71, as is shown in Figures 16 and 18. The forward end of key 150 is formed into a lug 165 which moves freely in a slot of a bracket 167 rigid on the carriage frame, which slot limits downward and upward movement of the key 150 to the extent that, when depressed, the member 160 just clears the tabulator bar 72 as shown in Figure 18.

When the key 150 is held depressed, during a return to the left of the carriage 27 from a tabulated position, the lower U-shaped end of the member 160 wipes on the stops 71, and restores the stops to their inoperative position in the tabulator bar 72.

The above description is of a preferred embodiment only of my invention and is not to be taken in a limiting sense as many structural variations are possible within the scope of the following claims.

What is claimed is:

1. In a typewriting machine having a frame, a carriage movable thereon, an escapement mechanism for restraining said carriage and power means to move said carriage in one direction for letter space and tabulating movements, a tabulating key, means operated thereby to free said carriage from the restraint of said escapement mechanism, a columnar stop member, a stop member projectable by said tabulating key into an intercepting position with respect to said columnar stop member, one of said stop members being on said frame and the other on said carriage, means mounting said columnar stop member for movement to a non-intercepting position with respect to said projectable stop member and for a limited movement in said mounting means in the direction of said tabulating movement when intercepted by said projectable stop member, power means controlled by said columnar stop member during said limited movement when intercepted by said projectable stop member to move said columnar stop member to the non-intercepting position and means operated by said columnar stop member during said power operated movement to free said escapement mechanism from the control of said tabulating key.

2. In a typewriting machine having a frame, a carriage movable thereon, spring means urging said carriage for movement in a tabulating direction and escapement mechanism to restrain said carriage against movement by said spring means, a tabulator key, a connection operable thereby to disable said escapement mechanism and free said carriage for tabulating movement, a stop member moved by said key into an effective position, a normally fixed columnar stop member mounted for a limited movement in the direction of carriage travel and shiftable by power in a direction perpendicular to the direction of said carriage travel, one of said stop members being on said frame and the other on said carriage in a position such that said projectable stop member will, when projected, intercept said columnar stop member during a tabulating movement of said carriage and move it said limited movement, power means controlled by said columnar stop member during said limited movement to shift said columnar stop member in said perpendicular direction to disengage it from said projectable stop member and means operated by said columnar stop member in said power operated shifting movement to cause reenablement of said escapement mechanism.

3. A typewriting machine comprising a frame, a carriage movable thereon in a tabulating direction, power means to urge said carriage in said tabulating direction, an escapement mechanism to normally restrain said carriage against movement in said direction, and a tabulating mechanism for said carriage to determine movement of said carriage to a desired columnar position, said tabulating mechanism comprising a tabulator key, a connection operable thereby to free said carriage from the restraint of said escapement mechanism, a normally fixed columnar stop member, a stop blade projectable by said tabulator key into intercepting relation with said columnar stop member, power means controlled by said columnar stop member upon engagement thereof by said projectable stop blade to withdraw said columnar stop member from said engagement and a connection from said columnar stop member to said tabulator key connection to disable said tabulator key connection and thereby restore said carriage to restraint by said escapement mechanism.

4. In a typewriting machine having a frame, a carriage mounted on said frame for movement in a tabulating direction and return, means to move said carriage in said tabulating direction and an escapement mechanism to restrain said carriage against movement in said direction, a tabulating mechanism comprising, a tabulator key, a connection including an interponent between said tabulator key and said escapement mechanism to disable said escapement mechanism upon depression of said key, a fixed stop, a stop blade projectable by said tabulator key, said fixed stop and said stop blade when projected being relatively movable in intersecting paths, means controlled by said fixed stop when struck by said projectable stop blade to withdraw said fixed stop from said stop blade, and a connection operable by said controlled means to withdraw said interponent to reenable said escapement mechanism.

5. In a typewriting machine having a frame, a carriage movable on said frame, power means to urge said carriage in a tabulating direction, and an escapement mechanism to normally hold the carriage stationary against the urge of said power means, a tabulating mechanism to control movement of said carriage to a desired columnar position, said tabulating mechanism comprising, a tabulator key, a normally effective connection operable by said key to disable said escapement mechanism and free said carriage for movement by said power means, a columnar stop member, a stop blade projectable by said tabulator key to an effective position with respect to said columnar stop member, cyclically operable means controlled by said columnar stop member when engaged by said stop blade to withdraw said stop member from said engagement and means operable by said stop member during said withdrawal to disable said connection from said tabulator key to said escapement mechanism.

6. In a flat platen typewriter having a frame, a typing carriage shiftable on said frame, spring means to urge said carriage in one direction and escapement mechanism to hold said carriage against the urge of said spring means, a tabulating mechanism comprising a depressible tabulator key in said carriage, tabulator key operable means to release said escapement mechanism and free said carriage to the urge of said spring means, a stop blade rendered effective by said tabulator key, a stop member on said frame for engagement by said stop blade when so rendered effective, mounting means for said stop member, said mounting means holding said stop member for limited movement with said carriage when engaged by said stop blade and for movement in another direction perpendicular thereto, cyclic means to move said stop member in said other direction, means operated by said stop member during movement with said carriage to initiate operation of said cyclic means, and a slidable connection from said stop member to said carriage, said slidable connection operable by said stop member during movement in said other direction to disable said tabulator key operable means.

7. In a typewriter having a frame, a carriage shiftable thereon, and an escapement mechanism to restrain said carriage against movement in one direction, a tabulator mechanism comprising a columnar stop member, a projectable stop blade, means mounting said stop member for movement in said one direction of carriage shift, cyclic mechanism to shift said columnar stop member in a direction perpendicular to said direction of carriage shift, a cyclic mechanism release arm operable by said stop member during said movement with said carriage, a tabulator key operable to release said carriage from restraint by said escapement mechanism for movement in said one direction and to project said stop blade for engagement with said columnar stop member during said carriage movement and means operated by said columnar stop member during said movement by said cyclic mechanism to disable said tabulator key from control over the release of said carriage.

8. In a typewriter having a frame, a carriage shiftable thereon, and an escapement mechanism to restrain said carriage against movement in one direction, a tabulator mechanism comprising a columnar stop member, a projectable stop blade, means mounting said stop member for movement in said one direction of carriage shift, cyclic mechanism to shift said columnar stop member in a direction perpendicular to said direction of carriage shift, a cyclic mechanism release arm operable by said stop member during said movement with said carriage, a tabulator key operable to release said carriage from restraint by said escapement mechanism for movement in said one direction and to project said stop blade for engagement with said columnar stop member during said carriage movement, means operated by said columnar stop member during said movement by said cyclic mechanism to disable said tabulator key from control over the release of said carriage, resilient means to restore said columnar stop member to its original position during operation of said cyclic mechanism and means operable upon release of said tabulator key to render said tabulator key again operable to release said carriage.

9. In a typewriting machine having a frame, a carriage shiftable on said frame, spring mechanism to move said carriage in one direction and an escapement mechanism normally effective to restrain said carriage against movement, a tabulating mechanism to control shifting of said carriage to a columnar position, said tabulating mechanism comprising a tabulator key, a tabulator key controlled linkage including an interponent to disable said escapement mechanism, a stop blade on said carriage projectable by said tabulator key, a fixed columnar stop on said frame so positioned as to be engageable by said stop blade when projected, said fixed stop shiftable with said stop blade upon such engagement, a cyclic clutch, clutch release means operated by said columnar stop during shiftable movement with said stop blade, means operable by said clutch to withdraw said columnar stop from engagement with said stop blade, restoring means operable thereafter to restore said fixed stop to normal position, a linkage operated by said fixed stop during said withdrawal movement to withdraw said interponent and thereby disable said tabulator key controlled linkage and restore said escapement mechanism to control over said carriage and means to restore said interponent into said tabulator key controlled linkage upon return of said tabulator key to an undepressed position.

10. In a tabulating mechanism for a typewriter carriage, the combination of a columnar stop bar engageable by projected stop blades during a tabulating movement of a carriage, means mounting said stop bar for limited movement in one direction, a one cycle clutch, clutch release means operated by said stop bar during said limited movement, means operated by said clutch to move said columnar stop bar in another direction, and spring means operable upon release of said columnar stop bar to restore said stop bar to its first position.

11. In a typewriter machine having a frame, a carriage, means urging said carriage in one direction, and escapement mechanism to normally hold said carriage stationary, a tabulating mechanism for said carriage comprising a tabulator key, means operable by said key to disable said escapement mechanism, a counterstop normally in an effective position, a tabulation stop blade settable by said key into an effective position with respect to said counterstop blade, a cyclic power driven mechanism, a release arm for said cyclic mechanism, said release arm operated by said tabulator stop blade through said counterstop, a connection operable by said cyclic mechanism to withdraw said counterstop from effective position, a linkage connected to said counterstop and operable thereby upon withdrawal of said counterstop to reenable said escapement mechanism and resilient means to restore said counterstop into an effective position.

JACOB N. HOFFMAN.

References Cited in the file of this patent

UNITED STATES PATENTS

| Number | Name | Date |
|---|---|---|
| 908,220 | Dukes et al. | Dec. 29, 1908 |
| 1,235,158 | Pillings | July 31, 1917 |
| 2,384,060 | Yaeger | Sept. 4, 1945 |